Jan. 27, 1953 M. GARLAND 2,626,608
CLAMP FOR UMBILICAL CORDS AND THE LIKE
Filed Dec. 8, 1949 2 SHEETS—SHEET 1
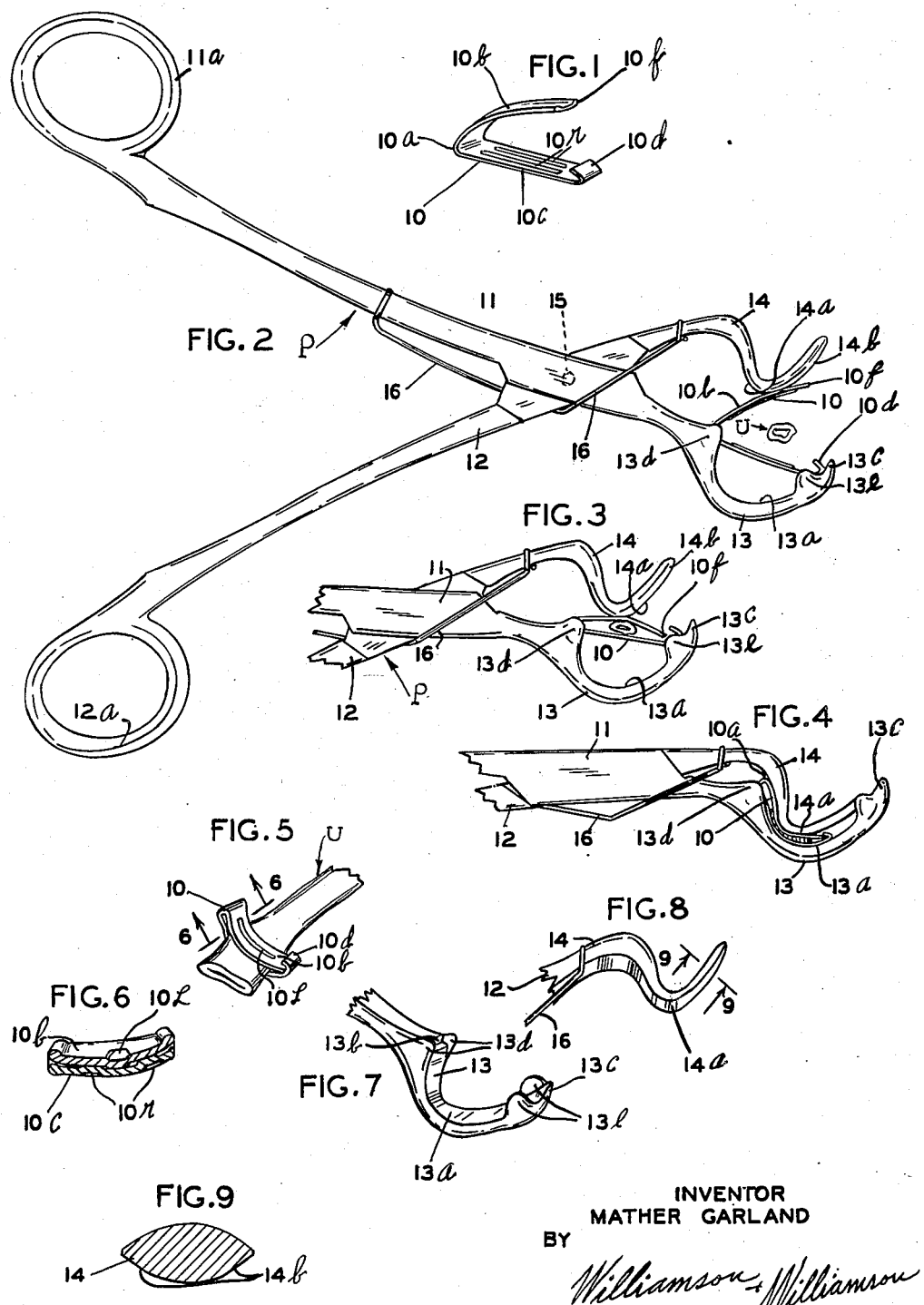
INVENTOR
MATHER GARLAND
BY
Williamson & Williamson
ATTORNEYS

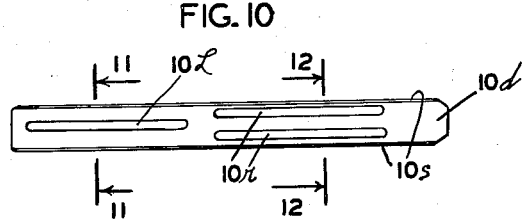
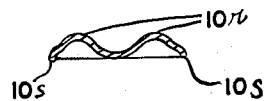
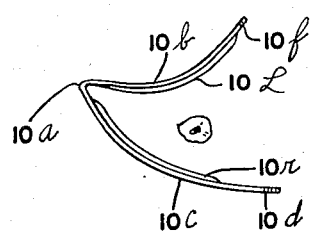
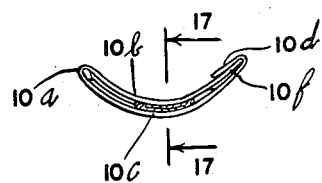
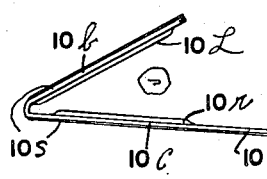
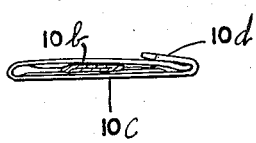
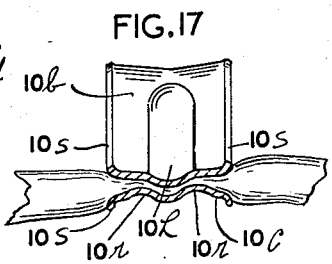

Patented Jan. 27, 1953

2,626,608

UNITED STATES PATENT OFFICE 2,626,608

CLAMP FOR UMBILICAL CORDS AND THE LIKE

Mather Garland, Mound, Minn.

Application December 8, 1949, Serial No. 131,733

8 Claims. (Cl. 128—346)

This invention relates to apparatus including a highly efficient clamp for sealing and clamping an umbilical cord or analogous tubular vessel or conduit.

Various umbilical clips and funis clamps have been patented and in some instances, put into restricted use but all of these devices, to my knowledge, have been objectionable for one reason or the other. In some instances, umbilical clamps heretofore used have been unsafe for the reason that the jaw members of the clamping structure were not permanently secured in operative relation. In many instances, the clip or clamp could not be applied until after cutting of the cord and then only with difficulty while in other instances, the clamp could not be depended upon to thoroughly clamp and seal the cord and retain the same in sealed relation.

It is an object of my invention to provide apparatus comprising a highly efficient metal clamp cooperatively related with a special pliers to enable the clamp to be positively applied and locked from an open position, receiving the uncut cord and bent and formed to give double strength and a greater area for efficiently clamping flexible tubular members such as cords of various sizes.

A further object is the provision of an extremely simple, one piece clamp of the class described which has positive locking facilities and to assure safety, which is of extremely light weight and sanitary and which when operatively applied, lies in an arcuate or curved form preventing injury if the cord becomes displaced about a baby's neck.

It is a further object to provide a clamp of the class described which contains no sharp edges whereby the cord may be cut and which is of such simplicity and structure that the cost thereof is negligible.

Another object is the provision of a clamp of the class described wherein the most efficient clamping application may be obtained with elimination of all rough or sharp edges to prevent possible injury to the umbilical cord or other tubular element to be constructed.

These and other objects and advantages of my invention will more fully appear from the following description made in connection with the accompanying drawings wherein like reference characters refer to similar parts throughout the several views and in which:

Fig. 1 is a perspective view of an embodiment of my improved clamp in open position, ready for application to a cord or shank;

Fig. 2 is a side elevation showing my special clamp operating, forming and locking pliers in initial clamp retaining position with one of my clamps positioned therein for application;

Fig. 3 is a similar view with the handle portions of the pliers broken away showing the position of the jaws of the pliers and the legs of the clamp during the first stages of the clamp-applying operation;

Fig. 4 is a similar view showing the positioning of the jaws of the pliers and the formation of the clamp and sealing of the flexible cord in the last stage of operation of the pliers;

Fig. 5 is a perspective view of the clamp operatively applied to a section of cord;

Fig. 6 is an enlarged detail section taken on the line 6—6 of Fig. 5;

Fig. 7 is a perspective view of the operating face of the lower jaw of the pliers detached;

Fig. 8 is a perspective view of the operative face of the upper jaw of the pliers detached; and Fig. 9 is an enlarged detail section taken on the line 9—9 of Fig. 8.

Fig. 10 is a plan view on an enlarged scale showing the strip properly formed and corrugated for constituting the several forms of clamps or clip disclosed herein;

Fig. 11 and Fig. 12 are cross sections taken on the lines 11—11 and 12—12 of Fig. 10;

Fig. 13 is a side elevation of a somewhat different form of clip than that shown in Fig. 1;

Fig. 14 is a side elevation of the same clamped about a tubular element;

Fig. 15 is a side elevation of another form of clamp;

Fig. 16 is a side elevation of the same clamped about a flexible tube; and

Fig. 17 is a cross section taken on the line 17—17 of Fig. 14.

The clamp shown in Figs. 1 and 2 is integrally formed from a strip of non-corrosive ductile or malleable metal such as thin aluminum which is capable of being forcibly bent and retaining its shape when bent. The clamp indicated as an entirety by the numeral 10 is before operation thereof, in the general form of a letter V having an apex 10a medially of its length and having a pair of opposed clamping legs 10b and 10c diverging therefrom. The longer leg 10c has an extension that is inturned to form a normally open locking flange 10d related to the adjacent portion of the leg in the manner of a small inverted V. Longer leg 10c as shown, is substantially straight from the apex 10a to the flange 10d.

The shorter leg 10b terminates in preferably a straight end 10f adapted during application and forming of my clamp through the cooperation of a pair of special pliers P to be projected beneath the locking flange 10d of the longer leg and thereafter positively locked and clinched under said flange. Leg 10b is also preferably curved or bent at an intermediate portion although this bending is not essential to the shape, functioning or operation of my apparatus.

In the form of the clamps shown, the longer leg 10c is provided with a pair of longitudinally extending, parallel ribs 10r protruding from the inner surface thereof and extending from points adjacent the apex 10a to points short of the bent extremity 10d. These ribs may be conveniently formed by a die in corrugated manner and serve to reinforce the leg 10c as well as to provide between the ribs, a seating channel to receive a complementary longitudinal rib 10L formed centrally in the leg 10b and protruding from the inner side thereof. The longitudinal edges of the legs 10b and 10c are formed into beaded or rounded portions as clearly shown in Fig. 6 to prevent any tendency of cutting a cord or other member when the clamp is applied.

To apply, lock and form my clamp 10, I have perfected and provided a special tool, preferably in the form of a pair of pliers P having a pair of crossed shanks 11 and 12 pivoted adjacent their outer ends upon a pivot screw 15 and having a thumb and finger handle respectively, 11a and 12a, fixed to the extremities thereof. Shank 11 has integrally formed therewith, a jaw 13 having a curved outer portion and provided with a substantially arcuate clamping surface 13a near the outer extremity thereof and having a notch or shoulder 13b disposed just inwardly of the concave portion for seating and receiving the apex 10a of one of the clamps. The jaw 13 at its outer extremity is provided with an abutment finger 13c having shouldered relation with reference to a seat to initially abut and retain the outer extremity of the leg 10c of one of my clamps. Jaw 13 is also preferably but not necessarily provided with a pair of spaced retaining ears 13d disposed just forwardly or outwardly of the apex retaining seat 13b and a second pair of strip-retaining ears 13e disposed just rearwardly of the shoulder and abutment extremity 13c.

The shank 12 of the pliers has integrally formed or otherwise rigidly secured therewith, a reversely curved jaw indicated as an entirety by the number 14 and having at its outer portion, a convex clamping section 14a opposed to the clamping jaw portion 13 and complementarily shaped to the concave opposed jaw portion 13a. Jaw 14 is also preferably provided on the anvil or die portion opposed to the jaw section 13a with longitudinally beveled surfaces 14b which assist in nesting and properly aligning the clamp 10 to prevent lateral displacement and which cooperate in the clamping and forming action to contour the upper leg 10c of the clamp in concavo convex cross sectional form, as clearly shown in Fig. 6.

I prefer to provide means such as a clip spring 16 for urging the shanks and consequently, jaws 13 and 14 together with light pressure adequate to retain the clamp in its open position.

In use, one of my clamps is readily applied to the pliers P with the jaws 13 and 14 of the pliers in open position, as shown in Fig. 2, the apex 10a of the clamp being seated in the apex notch 13b of jaw 13 and the ends of the legs 10b and 10c of the clamp being respectively engaged by the convex clamping surface 14a of jaw 14 and the abutment finger 13c of jaw 13 of the pliers. The clamp is held in the open position for application shown in Fig. 2 with the light tension placed on the jaws by spring 16 retaining the clamp from falling out. The retaining ears 13d and 13e serve to more securely retain the clamp or clip 10 although they may be dispensed with and satisfactory results obtained.

The clamp in the pliers P may then be moved to partially surround an unbilical cord U or other tubular or shank like member.

In surrounding position, as shown in Fig. 2, the jaws of the pliers are forced together by manipulation of the handles 11a and 12a of the shanks, causing in the first closing movement of the jaws, the leg 10b to be moved towards the longer leg 10c, its extremity 10f slipping beneath the hook like clinching flange 10d of the longer leg to the position shown in Fig. 3. Further closing movement of jaws 13 and 14 bends and forms the shorter leg 10c of the clamp first to substantially a straight position with the extremity 10f longitudinally moving outwardly beneath the clinching flange 10d. Thereafter, closing movement of the plier jaws starts the curving or bowing of the two legs 10b and 10c shortening the over-all length of the doubled clamp member and bringing the hook flange 10d into position beneath the outer portion of the convex jaw clamping surface 14a. At this time, the extremity of the longer leg 10c has become disengaged by the abutment finger 13c and is interposed between the outer portions of the cooperating clamping surfaces 13a and 14a of the two jaws, as shown in Fig. 4.

The jaws 13 and 14 are moved together to the extreme limit of movement, clamping the legs tightly against the cord or shank U and forming the clamp into the arcuate, operative position shown in Figs. 4 to 6 inclusive for tightly sealing the cord or tube and for very positively affixing the clamp to the cord, tube or shank.

It is to be understood that all of the longitudinal edges of my clamp are nicely rounded to prevent any possible cutting of the skin or cord at the area of stricture or in adjacent portions thereof.

As will be seen from Figs. 6 and 17, when my clamp is applied the longitudinal rib 10L of the shorter leg 10b seats in the channel formed between the spaced, longitudinal ribs 10r of the longer leg 10c, producing a very effective sealing action of a tubular cord such as the umbilical cord or an artery. The cord is actually clamped and sealed throughout a double, reversely curved clamping zone. My clamp or clip 10 is of such simplicity and is so light that when used upon an umbilical cord, it may be retained by the baby until the cord sloughs off. The smooth, rounded, longitudinal edges of the legs of the clamp prevent any injury to cord or the skin of the baby.

The inherent form of the clamp 10 and its formation and bending into arcuate shape by the carrying out of my method and the use of my forming and clinching jaws, results in a strong, rigid construction of double thickness with reinforcing through the arcuate bending. The curved structure of the clamp when operatively formed and applied, gives greater area on the contacting or clipping portions than if the structure were retained in straight line clamping position.

It will further be seen that ease and accuracy of application of my structure due to the combination of the novel structure of clip as well as the inventive tool for forming and clinching and clamping the structure, is an important factor. For medical or surgical uses, the clamp may be instantly applied before the umbilical cord is cut.

While my structure and method has particular applicability for surgical use on umbilical cords and other conduits of the human body, it is also well adapted for use as an attachment tag or identification for application to the legs of fowls or for application to rods or shank like elements of mechanical structure or apparatus.

Referring now to the second sheet of the drawings Fig. 10 shows in top plan a strip of aluminum or aluminum alloy or other suitable ductile metal cut out and formed to constitute the various forms of clamp disclosed in Fig. 1 and in Figs. 11 to 16 inclusive. From an inspection of enlarged, cross sectional views Figs. 11 and 12, it will be noted that the longitudinal edges of the strip are turned and formed somewhat inwardly to constitute smooth, rounded, marginal elements 10s. The longitudinal ribs 10L and 10r as shown in Figs. 10 to 12 are formed on the top face of the strip and are opposed when the strip is bent into general V-shape along the apex 10a. The depths of these corrugations or ribs are indicated in preferred form in the cross sectional views, Figs. 11 and 12. It will be noted that the end 10d of the strip which forms the locking flange or hook is uncorrugated to facilitate the bending or formation of the locking flange.

In Figs. 13 and 14, a somewhat different form of my clamp is illustrated wherein through the relation and shaping of the two legs 10b and 10c, my method of clamping and sealing a flexible, tubular element such as an artery or umbilical cord may be very quickly and accurately carried out by hand. In this form, both the upper and lower legs of the clamp or clip are curved alike upon substantially arcuate lines again giving the general configuration of a V in the manufacture of the finished clamp with the extremities of the clamp disposed widely apart for facilitating application to a cord or shank like member.

This clamp shown in Figs. 13 and 14 may be applied and a flexible, tubular element such as an umbilical cord securely clamped by finger pressure upon the medial and corrugated portions of the two legs 10b and 10c. Finger pressure is sufficient to force the medial, corrugated portions of the two legs together with the longitudinal rib 10L of the upper leg seated in the channel formed between the two opposed ribs 10r of the longer and lower leg 10c. The uncorrugated end 10d of the lower leg or jaw may then be, by finger pressure, folded tightly over the extremity 10f of the shorter jaw to clinch and tightly lock the device as shown in Fig. 14. If it is desired to apply even further clamping pressure, the doubled applied clamp may be bent through a shorter arc, thereby further clamping the umbilical cord or other tubular element gripped.

In Fig. 15 and Fig. 16, a slightly different form of the invention is shown where the clip as manufactured, has the upper and lower legs 10b and 10c of straight configuration. Here, the uncorrugated outer locking end 10d of the lower leg is preferably somewhat longer than the corresponding part of the forms previously described. In this form, as in the forms shown in Figs. 13 and 14 of the invention, my method of clamping a tubular element or shank may be carried out manually by forcing the two legs 10b and 10c together and then clinching the uncorrugated locking portion of the lower leg against the doubled structure. This structure where comparatively stiff but bendable strip material is utilized for the clamp, is adequate to seal and positively clamp the flexible elements of many types. Here, again if further clamping action is desired, the applied clamp as shown in Fig. 16 may be bent by curving the same concavely when viewed from the top to further apply clamping pressure and to increase the rigidity of the structure.

From the foregoing description with reference to Figs. 13 to 17, it will be seen that my method is not limited to initially forcing the legs together and clinching the locking flange over the extremity of the shorter leg through application of a die-equipped or anvil-equipped instrument or tool but may be carried out successfully within the scope of my invention by hand.

With further reference to the important advantages of all forms of my clamp structure per se, it will be noted that two sets of longitudinal corrugations are formed in the strip which in the clamping operation have opposed and a close cooperative relationship. The strip constructed of aluminum or other suitable ductile metallic material being malleable is adapted to be corrugated longitudinally and throughout the thickness thereof, to form as shown in the longer leg 10c, a pair of spaced ribs or corrugations and in the shorter leg 10b, as shown, a single rib or corrugation.

When the two legs are forced together to clamp against a tubular element or shank, the ribs will interlock thereby preventing lateral displacement of the two legs and of course through their original inherent structure will afford reinforcement longitudinally of the legs. However, when the double clamp is set as described and then is deformed by sharply curving (longitudinally of the clamp) the corrugated structure, the inherent nature of the corrugated or embossed longitudinal elements causes deformation thereof to produce a stiffening and resultant rigidity of the double structure which itself resists retraction of the legs. Thus, the longitudinal cooperating complementary corrugations or ribs of the two legs are structurally changed during the longitudinal bending or curving of the doubled clamp structure after initial application either by the applying and forming pliers or through the longitudinal bending step of my method carried out by hand.

It will of course be understood that various changes may be made in the form, details arrangement and proportions of the parts without departing from the scope of my invention.

I claim:

1. A clamp for flexible tubular elements and the like, comprising a pair of opposed clamping legs in the form of strip portions constructed from ductile material of such ductility as to be bent with facility and to retain its shape when bent, means fixedly interconnecting said legs in a preformed, general V-shape, one of said legs being longer than the other and including an extension at one end thereof foldable over the free end of the other leg when said legs have been deformed into clamping relationship, the relative lengths of the legs being such that the legs can be moved relative to each other without the extension offering any resistance to movement of the shorter leg into clamping relationship with the longer leg.

2. The clamp of claim 1 and wherein the inner surfaces of the legs have protruding means for cooperative clamping interengagement.

3. The clamp as recited in claim 2 wherein said last recited means is comprised of a rib formation on a first of the legs and a complementary substantially parallel rib formation on the second of said legs.

4. The clamp as recited in claim 1 wherein a first of the legs is of longitudinal arcuate shape.

5. The clamp as recited in claim 1 wherein both of said legs are of longitudinal arcuate shape and the extension of the longer leg is adapted to be manually folded over the shorter leg.

6. The clamp as recited in claim 1 wherein both of said legs are substantially straight and the extension of the longer leg is adapted to be manually folded over the shorter leg.

7. The clamp as recited in claim 1 wherein the shorter leg is of longitudinal arcuate shape.

8. The clamp as recited in claim 1 wherein the shorter leg is of longitudinal arcuate shape and the other leg is substantially straight.

MATHER GARLAND.

REFERENCES CITED

The following references are of record in the file of this patent:

UNITED STATES PATENTS

| Number | Name | Date |
|---|---|---|
| 252,430 | Cohen | Jan. 17, 1882 |
| 597,649 | Lindas | Jan. 18, 1898 |
| 600,887 | Pettit | Mar. 22, 1898 |
| 1,792,837 | Harrison | Feb. 17, 1931 |
| 2,384,697 | Riccardi | Sept. 11, 1945 |
| 2,598,901 | Garland | June 3, 1952 |